(12) United States Patent
Hirabayashi

(10) Patent No.: US 12,147,147 B2
(45) Date of Patent: Nov. 19, 2024

(54) CAMERA

(71) Applicant: NIDEC COPAL CORPORATION, Tokyo (JP)

(72) Inventor: Koichi Hirabayashi, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 215 days.

(21) Appl. No.: 17/969,691

(22) Filed: Oct. 20, 2022

(65) Prior Publication Data

US 2023/0129149 A1   Apr. 27, 2023

(30) Foreign Application Priority Data

Oct. 21, 2021 (JP) .................. 2021-172205

(51) Int. Cl.
*G03B 17/04* (2021.01)
*G03B 5/00* (2021.01)
*G03B 17/12* (2021.01)

(52) U.S. Cl.
CPC ............. *G03B 17/045* (2013.01); *G03B 5/00* (2013.01); *G03B 17/12* (2013.01)

(58) Field of Classification Search
CPC ................................................... G03B 17/045
See application file for complete search history.

(56) References Cited

U.S. PATENT DOCUMENTS

2004/0150891 A1   8/2004   Ichino
2023/0037456 A1*  2/2023   Wakayama .......... G03B 17/045

FOREIGN PATENT DOCUMENTS

JP            2004233381 A      8/2004

\* cited by examiner

*Primary Examiner* — Noam Reisner
(74) *Attorney, Agent, or Firm* — HAUPTMAN HAM, LLP

(57) ABSTRACT

A camera is less likely to have lower light-shielding performance. The camera includes a frame accommodated in a housing having a front surface with an opening, a lens barrel accommodating a lens, a rear light shield that blocks light outside the lens barrel, and a pressure plate pressing the rear light shield against the frame and securing the rear light shield to the frame. A base in a stationary cylinder has an inner surface being rectangular, an arc surface extending outward in an arc along a cylindrical wall, and a contact surface in contact with a front surface of the pressure plate. The pressure plate includes a pressing portion being a rectangular frame extending along the inner surface of the base in the stationary cylinder and in contact with a rear connector in the rear light shield, and an extension extending outward from the pressing portion and facing the arc surface of the base in the stationary cylinder.

6 Claims, 16 Drawing Sheets

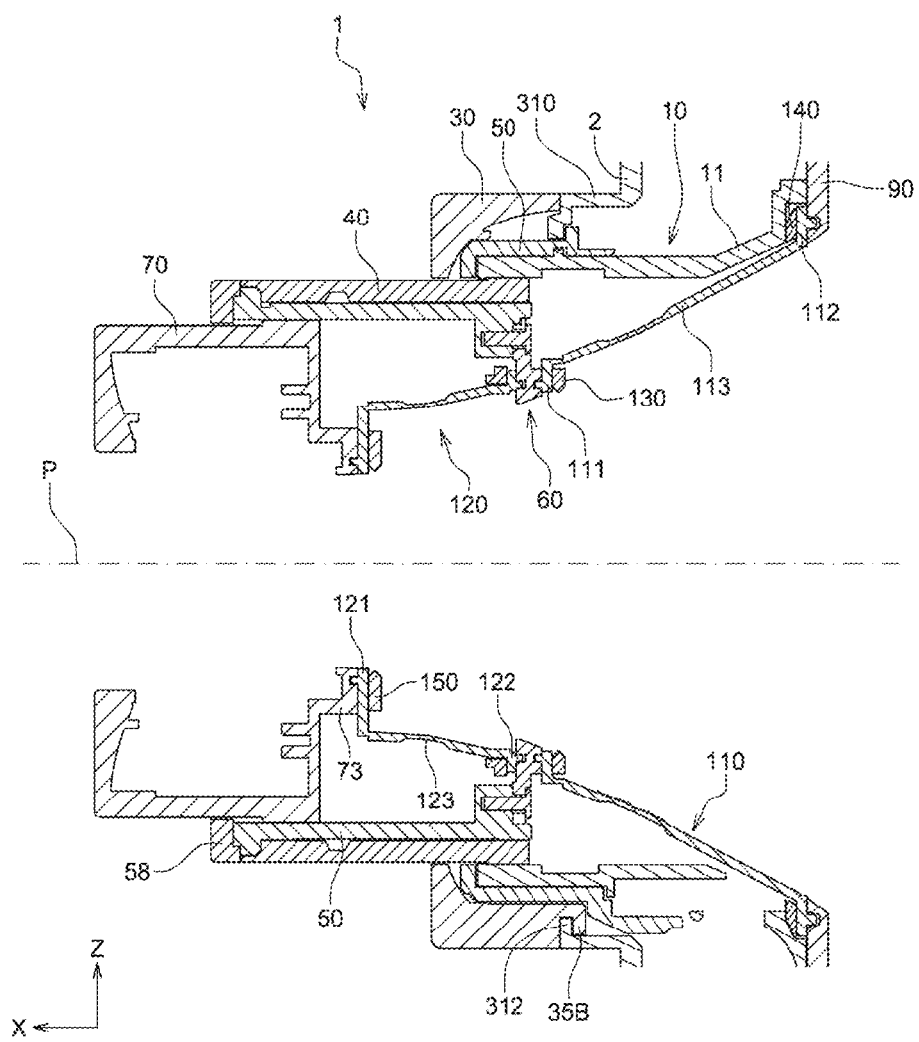

CAMERA

RELATED APPLICATIONS

The present application claims priority to Japanese Application Number 2021-172205, filed Oct. 21, 2021, the disclosure of which is hereby incorporated by reference herein in its entirety.

BACKGROUND

Technical Field

The present invention relates to a camera, and particularly, to a camera including a lens barrel that is extendable in an optical axis direction.

Description of the Background

A known camera includes a lens barrel extension assembly for allowing a lens barrel to extend frontward in an optical axis direction. In such a camera, the lens barrel is typically connected to a camera body with a flexible bellows to block entering light and dust when the lens barrel extends frontward (refer to, for example, Patent Literature 1). The bellows typically has an end being a rectangular frame secured to the camera body and is thus usually secured with a plate being a rectangular frame pressed against the camera body. In contrast, the component of the lens barrel fastened to the camera body usually has a cylindrical side wall. Thus, the plate being a rectangular frame pressing the bellows and the cylindrical side wall easily have a gap between them. Such a gap may cause the bellows to separate or slip off, thus lowering the light-shielding and dustproof performance of the bellows.

CITATION LIST

Patent Literature

Patent Literature 1: Japanese Unexamined Patent Application Publication No. 2004-233381

BRIEF SUMMARY

In response to the above issue, one or more aspects of the present invention are directed to a camera that is less likely to have lower light-shielding performance.

A camera according to one aspect of the present invention is less likely to have lower light-shielding performance. The camera includes a housing having a front surface with an opening, a frame accommodated in the housing, and a lens barrel accommodating at least one lens. The lens barrel includes a stationary cylinder including a base fastened to the frame and a cylindrical wall extending in an axial direction from the base, and an extendable unit located radially inward from the cylindrical wall of the stationary cylinder. The extendable unit is extendable in the axial direction through the opening in the housing. The camera further includes a light shield that blocks light outside the lens barrel entering an optical path between a part of the extendable unit and the frame and a pressure plate pressing the light shield against the frame and securing the light shield to the frame. The light shield includes a front connector being a rectangular frame fastened to the part of the extendable unit in the lens barrel, a rear connector being a rectangular frame located between the pressure plate and the frame, and a bellows connecting the front connector and the rear connector in an expandable manner. The base in the stationary cylinder has an inner surface being rectangular and facing an outer surface of the rear connector in the light shield, an arc surface extending outward in an arc from the inner surface along a part of the cylindrical wall, and a contact surface in contact with a front surface of the pressure plate. The pressure plate includes a pressing portion being a rectangular frame extending along the inner surface of the base in the stationary cylinder and in contact with the rear connector in the light shield, and an extension extending outward from the pressing portion and facing the arc surface of the base in the stationary cylinder.

BRIEF DESCRIPTION OF DRAWINGS

FIG. 10A is a longitudinal sectional view of the camera in FIG. 1 in a most extended state.

DETAILED DESCRIPTION

Figure 1:
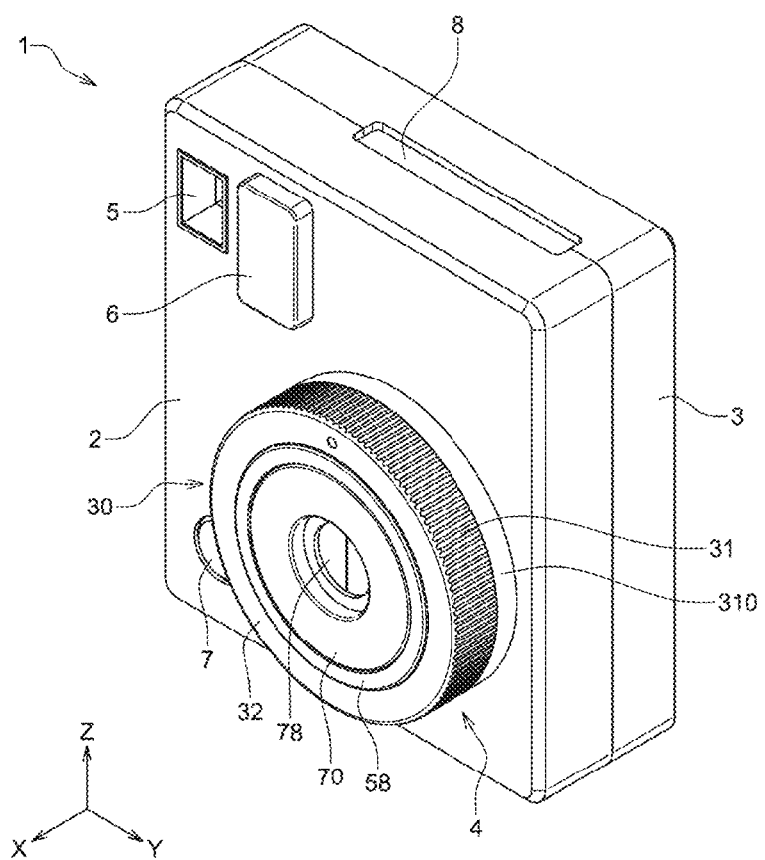
FIG. 1 is a perspective view of a camera according to one embodiment of the present invention.

A camera according to one or more embodiments of the present invention will now be described in detail with reference to FIGS. 1 to 16. In FIGS. 1 to 16, like reference numerals denote like or corresponding components. Such components will not be described repeatedly. In FIGS. 1 to 16, the scale and dimensions of each component may be exaggerated, or one or more components may not be shown. Unless otherwise specified, the terms such as first and second will be used simply to distinguish the components and will not represent a specific order or sequence.

FIG. 1 is a perspective view of a camera 1 according to one embodiment of the present invention. Although the camera 1 according to the present embodiment is a camera (instant camera) that uses a photographic film to be automatically developed after shooting, the present invention is also applicable to a camera other than such an instant camera. For ease of explanation in the present embodiment, the term front or frontward refers to the positive X-direction in FIG. 1, and the term rear or rearward refers to the negative X-direction in FIG. 1.

As shown in FIG. 1, the camera 1 includes a front cover 2, a rear cover 3 attached to the rear of the front cover 2, and a lens barrel 4 accommodating a lens unit. The front cover 2 includes a viewfinder 5. A flash window 6 is located adjacent to the viewfinder 5. A release button 7 is located in the negative Z-direction from the viewfinder 5. The front cover 2 and the rear cover 3 have, in their upper portions, an ejection slit 8 extending in Y-direction across the front cover 2 and the rear cover 3. A photographic film developed after shooting is ejected from the ejection slit 8.

Figure 2:
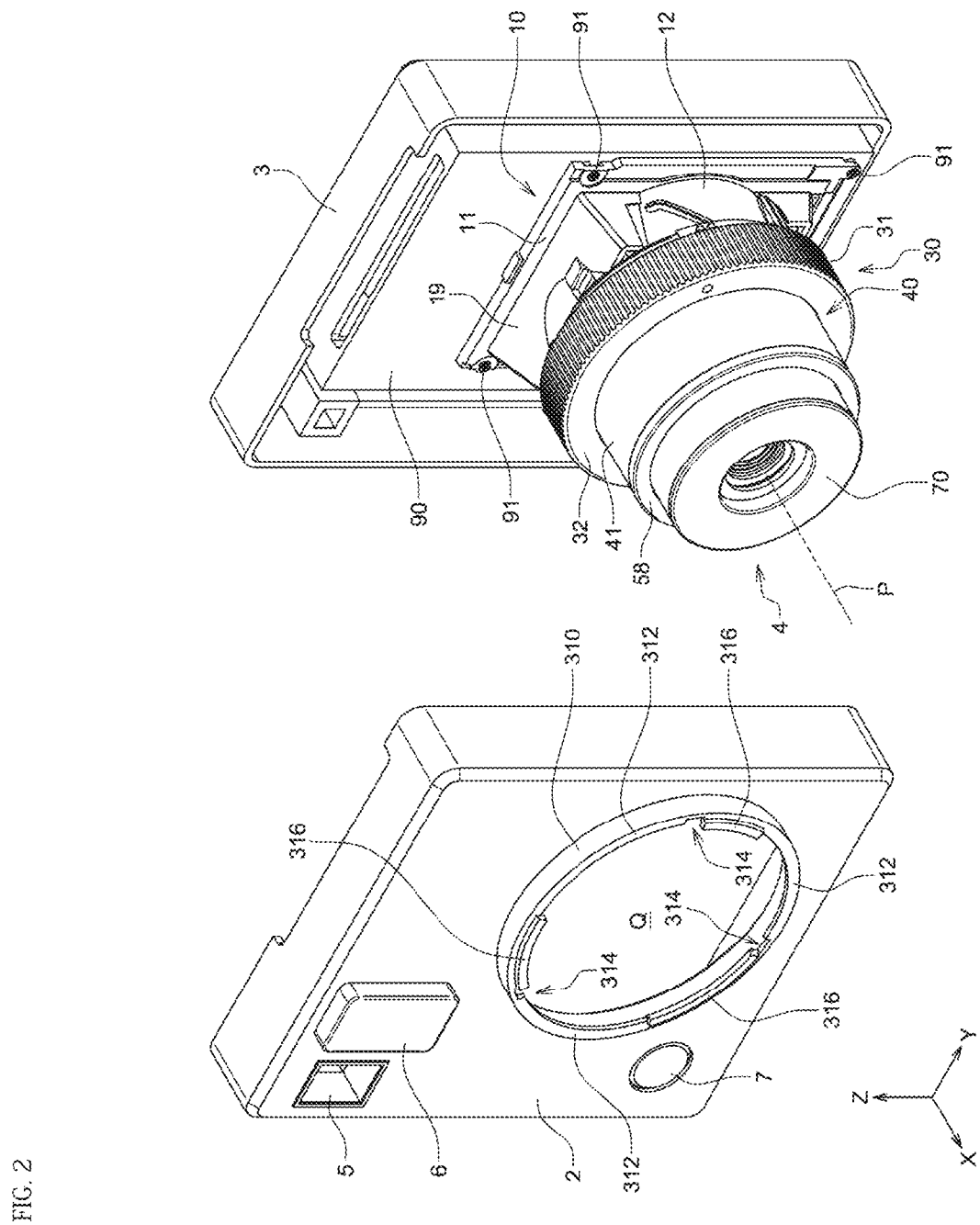
FIG. 2 is a perspective view of the camera in FIG. 1 with a lens barrel extending frontward and a front cover being removed.

The lens barrel 4 in the present embodiment is extendable in an optical axis direction. The lens barrel 4 shown in FIG. 1 is retracted furthest in the optical axis direction (X-direction). The state of the camera 1 with the lens barrel 4 in the state shown in FIG. 1 is referred to as a retracted state of the camera 1. FIG. 2 shows the lens barrel 4 extending to its maximum length in a direction (X-direction) along an optical axis P and the front cover 2 being removed. The state of the camera 1 with the lens barrel 4 in the state shown in FIG. 2 is referred to as a most extended state of the camera 1.

As shown in FIG. 2, the front cover 2 has a substantially circular opening Q in its front surface. A part of the lens barrel 4 extends and retracts along the optical axis P in front of the front cover 2 through the opening Q. The front cover 2 and the rear cover 3 form a housing that accommodates a substantially rectangular frame 90. The frame 90 contains, for example, a photographic film. The lens barrel 4 is attached to the frame 90.

Figure 3:
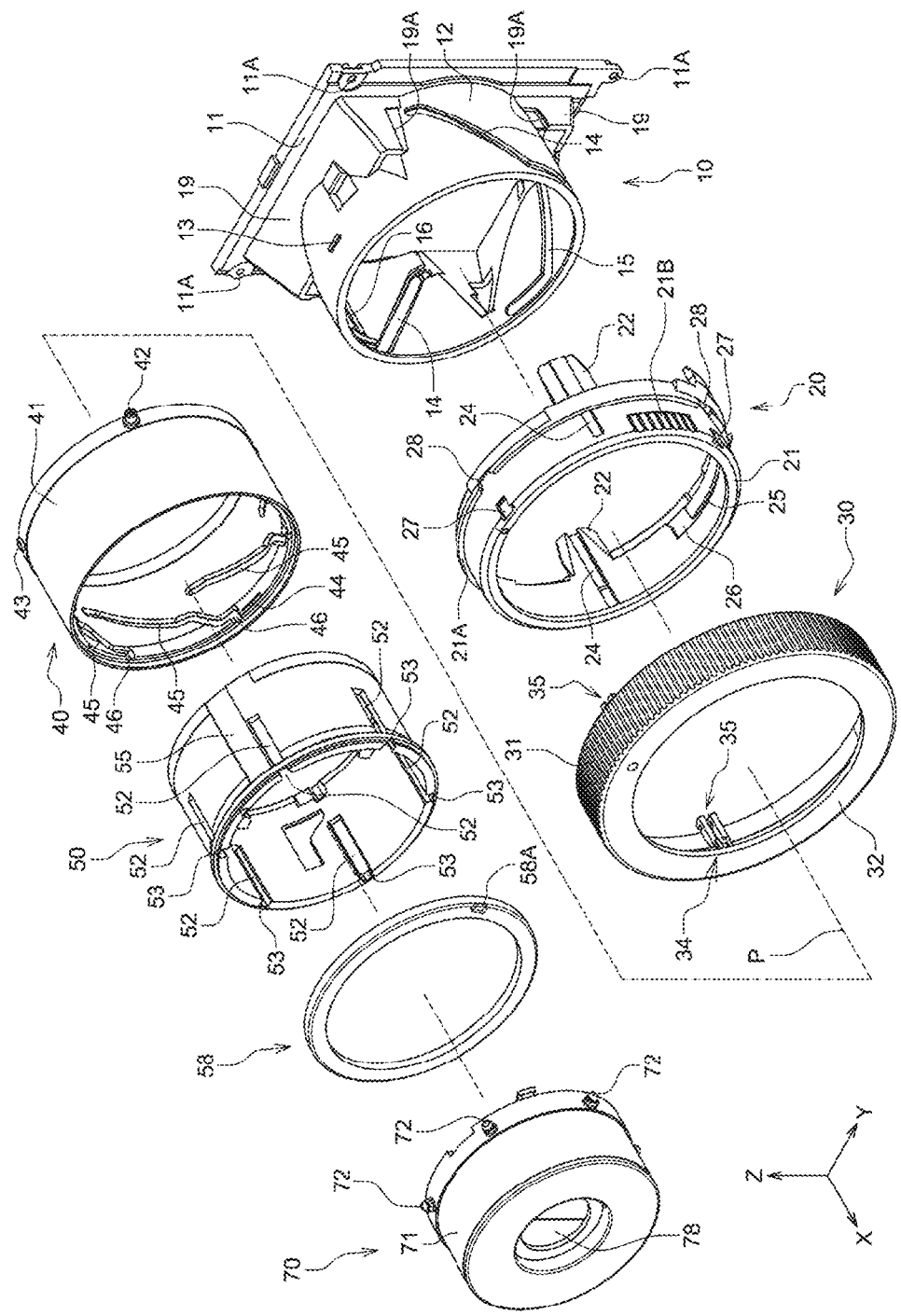
FIG. 3 is an exploded perspective view of the lens barrel in the camera in FIG. 1.

FIG. 3 is an exploded perspective view of the lens barrel 4 in the camera 1 in FIG. 1. As shown in FIG. 3, the lens barrel 4 in the present embodiment includes a stationary cylinder 10, a drive cylinder 20 (operation ring), a cover cylinder 30, a rotary cylinder 40, a key cylinder 50, a cover ring 58, and a linearly movable cylinder 70. The stationary cylinder 10 is attached to the front surface of the frame 90. The drive cylinder 20 is rotatable relative to the stationary cylinder 10 without moving in an axial direction. The cover cylinder 30 covers the outer circumference of the drive cylinder 20. The rotary cylinder 40 is rotatable relative to the stationary cylinder 10 and movable in the axial direction. The key cylinder 50 is movable in the axial direction together with the rotary cylinder 40 without rotating relative to the stationary cylinder 10. The cover ring 58 is attached to the front edge of the key cylinder 50. The linearly movable cylinder 70 is rotatable relative to the stationary cylinder 10 together with the key cylinder 50. In the present embodiment, the linearly movable cylinder 70 accommodates the lens unit including at least one lens (not shown). A barrier 78 that can be open and closed is located in front of the lens unit in the linearly movable cylinder 70. In the present embodiment, the rotary cylinder 40, the key cylinder 50, the cover ring 58, and the linearly movable cylinder 70 are included in an extendable unit that is extendable in the axial direction (X-direction) through the opening Q in the front cover 2.

Figure 4:
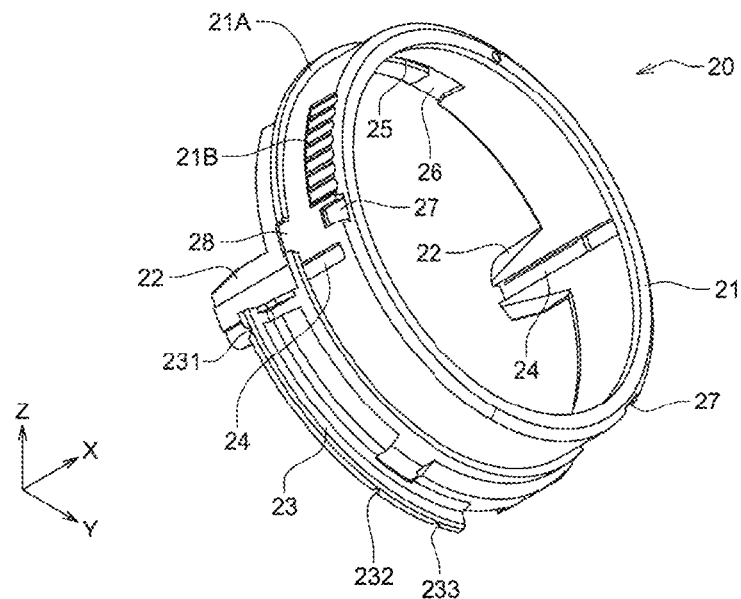
FIG. 4 is a perspective view of a drive cylinder in the lens barrel in the camera in FIG. 1.

FIG. 4 is a perspective view of the drive cylinder 20. As shown in FIGS. 3 and 4, the drive cylinder 20 includes a cylindrical portion 21 extending in the axial direction (X-direction), two extending portions 22 extending rearward from the cylindrical portion 21, and an arc-shaped piece 23 extending radially outward from the rear end of the cylindrical portion 21. The cylindrical portion 21 is located radially outward from the stationary cylinder 10. The cylindrical portion 21 includes, near its rear end, a flange 21A protruding radially outward. The cylindrical portion 21 has an outer circumferential surface with a knurled portion 21B to facilitate handling during assembly. The two extending portions 22 face each other across the optical axis P. The arc-shaped piece 23 has, on its rear surface, recesses 231, 232, and 233 at three circumferential positions that correspond to different extended states of the lens barrel 4.

The extending portions 22 and the cylindrical portion 21 have, on their inner circumferential surfaces, axial grooves 24 extending in the axial direction (X-direction). The cylindrical portion 21 has, on its inner circumferential surface, two circumferential grooves 25 extending in a circumferential direction and two connecting grooves 26 extending in the positive X-direction from the rear edge of the cylindrical portion 21 and connecting to the ends of the corresponding circumferential grooves 25. The two axial grooves 24, the two circumferential grooves 25, and the two connecting grooves 26 are all located at intervals of 180 degrees in the circumferential direction.

The cylindrical portion 21 has three recesses 27 on its front edge and a cutout 28 in a part of the flange 21A in the negative X-direction from each recess 27. The recesses 27 and the cutouts 28 are located at intervals of 120 degrees in the circumferential direction.

Figure 5A:
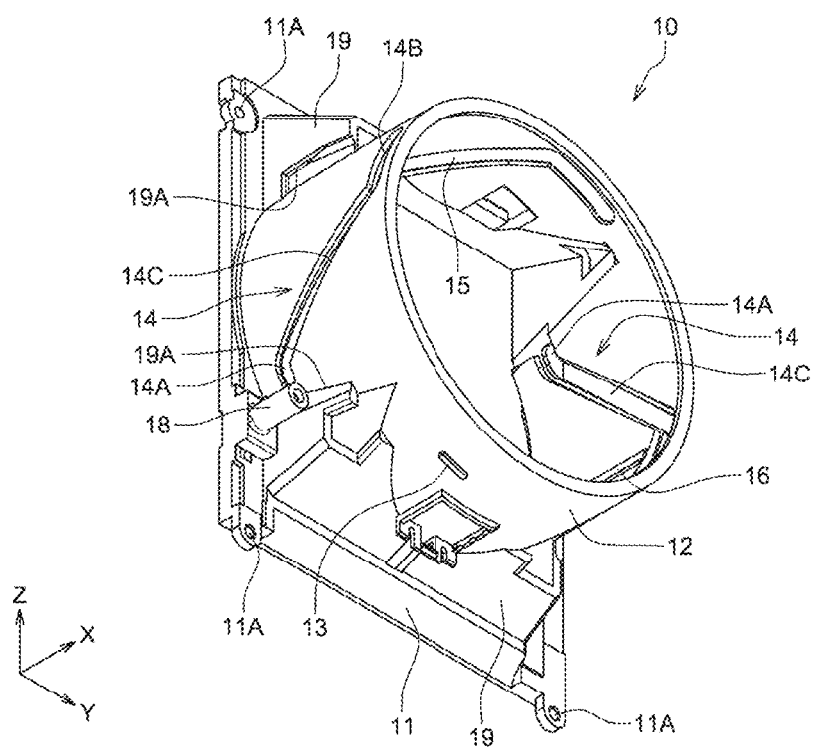
FIG. 5A is a perspective view of a stationary cylinder in the lens barrel in the camera in FIG. 1.
Figure 5B:
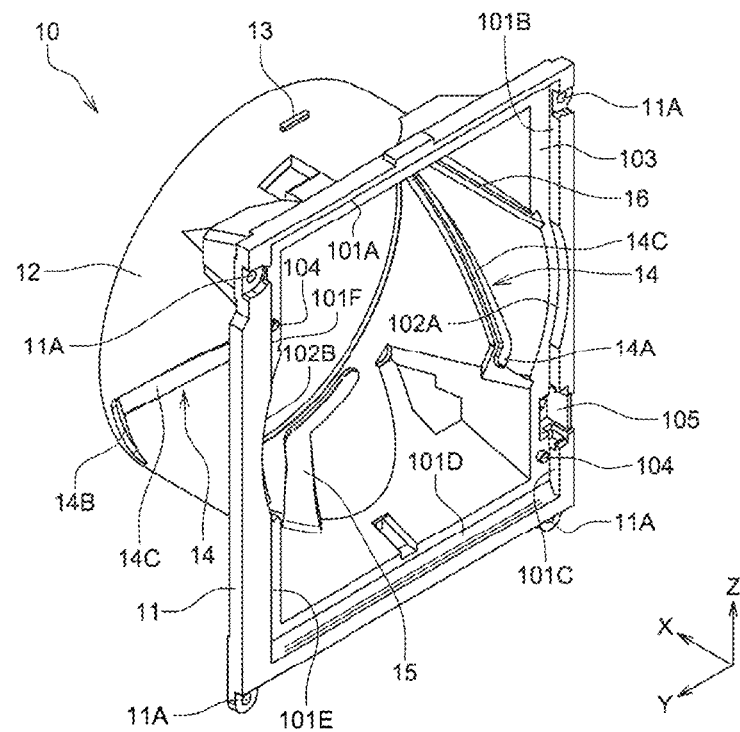
FIG. 5B is a perspective view of the stationary cylinder in the lens barrel in the camera in FIG. 1.

FIGS. 5A and 5B are perspective views of the stationary cylinder 10. As shown in FIGS. 2, 5A, and 5B, the stationary cylinder 10 includes a base 11 being a rectangular frame fastened to the frame 90, a cylindrical wall 12 extending frontward (in the positive X-direction) from the base 11, and two engagement tabs 13 protruding radially outward from the cylindrical wall 12. The base 11 in the stationary cylinder 10 includes a cylindrical pin holder 18 holding a pin 106 (refer to FIG. 15) in contact with the rear surface of the arc-shaped piece 23 in the drive cylinder 20 described above. The base 11 has threaded holes 11A in its four corners. The threaded holes 11A receive screws 91 (refer to FIG. 2). The screws 91 are screwed into the frame 90 to fasten the stationary cylinder 10 to the frame 90.

Each engagement tab 13 on the stationary cylinder 10 has a width in the axial direction (X-direction) (hereafter referred to as an axial width) slightly smaller than the axial width of the corresponding circumferential groove 25 on the drive cylinder 20. The engagement tabs 13 on the stationary cylinder 10 are thus engaged with the corresponding circumferential grooves 25 on the drive cylinder 20 and movable in the circumferential direction inside the circumferential grooves 25. The drive cylinder 20 with its circumferential grooves 25 engaged with the corresponding engagement tabs 13 on the stationary cylinder 10 can thus rotate relative to the stationary cylinder 10 without changing its axial position relative to the stationary cylinder 10.

Each engagement tab 13 on the stationary cylinder 10 has a width in the circumferential direction (hereafter referred to as a circumferential width) smaller than the circumferential width of the corresponding connecting groove 26 on the drive cylinder 20. To join the drive cylinder 20 to the stationary cylinder 10, the drive cylinder 20 is moved in the negative X-direction from the front of the stationary cylinder 10 with the engagement tabs 13 on the stationary cylinder 10 aligned with the corresponding connecting grooves 26 on the drive cylinder 20 in the circumferential direction. This allows the engagement tabs 13 on the stationary cylinder 10 to move in the axial direction (X-direction) inside the corresponding connecting grooves 26 on the drive cylinder 20 to the ends of the circumferential grooves 25. The drive cylinder 20 in this state is then rotated relative to the stationary cylinder 10. This allows the engagement tabs 13 on the stationary cylinder 10 to be engaged with the corresponding circumferential grooves 25 on the drive cylinder 20.

As shown in FIGS. 2, 5A, and 5B, the cylindrical wall 12 of the stationary cylinder 10 has two through-cam grooves 14 extending through the cylindrical wall 12. The two through-cam grooves 14 are located at intervals of 180 degrees in the circumferential direction. Each through-cam groove 14 includes a rear end 14A extending in the circumferential direction, a front end 14B extending in the circumferential direction, and an intermediate portion 14C connecting the rear end 14A and the front end 14B. The intermediate portion 14C of the through-cam groove 14 extends with its circumferential position gradually changing from the rear end 14A toward the front end 14B.

The cylindrical wall 12 of the stationary cylinder 10 has, on its inner circumferential surface, two cam grooves 15 extending in shapes corresponding to the through-cam grooves 14 described above and two axial grooves 16 extending in the axial direction (X-direction). In the present embodiment, the cam grooves 15 are at the positions rotated by 90 degrees about an axis relative to the through-cam grooves 14.

Referring back to FIG. 2, the opening Q in the front cover 2 is inside a cylindrical portion 310 extending in X-direction. The cylindrical portion 310 has a front edge including a flange 312 extending radially inward. The flange 312 partly has cutouts 314. Restrictors 316 protruding frontward from the flange 312 and extending radially inward are adjacent to the corresponding cutouts 314. The restrictors 316 are in contact with the front surface of the flange 21A in the drive cylinder 20 to restrict axial movement of the drive cylinder 20.

Figure 6:
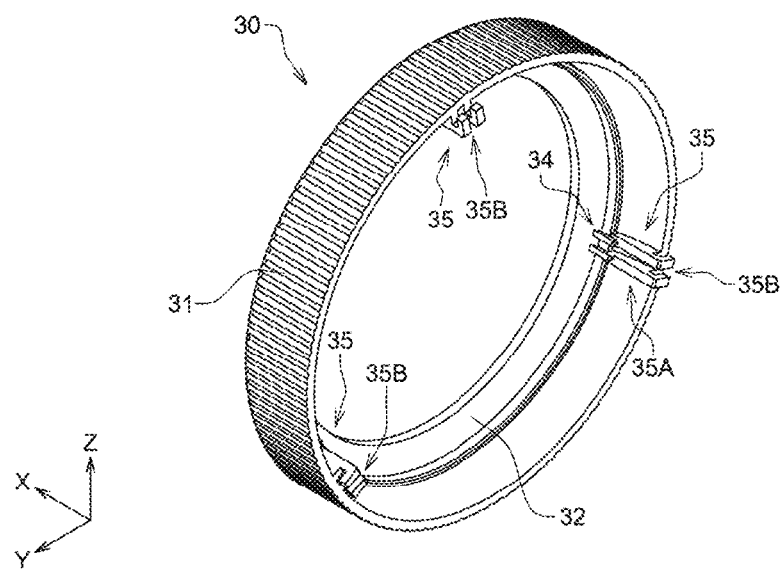
FIG. 6 is a perspective view of a cover cylinder in the lens barrel in the camera in FIG. 1.

FIG. 6 is a perspective view of the cover cylinder 30. The cover cylinder 30 is rotatable relative to the stationary cylinder 10 together with the drive cylinder 20 described above. As shown in FIG. 6, the cover cylinder 30 includes a cylindrical portion 31 extending in the axial direction (X-direction), an annular portion 32 extending radially inward from the front end of the cylindrical portion 31, three engagement members 34 on the inner circumferential surface of the cylindrical portion 31, and three hooks 35 each located behind the corresponding one of the three engagement members 34. The cylindrical portion 31 has an uneven outer circumferential surface for easy operation by a user. When the cover cylinder 30 formed from, for example, resin includes the engagement members 34 and the hooks 35 at various positions, the outer shape of the cover cylinder 30 may deform easily. Thus, in the present embodiment, the three engagement members 34 and the three hooks 35 are aligned with each other in the circumferential direction and located at intervals of 120 degrees in the circumferential direction.

Each engagement member 34 has a recess on its middle portion in the circumferential direction. Each hook 35 also has a recess on its middle portion in the circumferential direction. Each hook 35 includes a beam 35A extending in the negative X-direction from the corresponding engagement member 34 and an engagement tab 35B extending radially outward from the rear end of the beam 35A and being apart from the rear end of the cylindrical portion 31. The axial distance between the engagement tabs 35B in the hooks 35 and the rear end of the cylindrical portion 31 is slightly greater than the axial width of the flange 312 on the front cover 2 described above. The engagement tab 35B in each hook 35 can thus be engaged with the flange 312 on the front cover 2. This allows the cover cylinder 30 to be attached to the front cover 2 in a rotatable manner.

The engagement members 34 in the cover cylinder 30 have substantially the same circumferential width as the recesses 27 on the drive cylinder 20. Each engagement member 34 fits in (is engaged with) the corresponding recess 27 on the drive cylinder 20 in the circumferential direction. The engagement tab 35B in each hook 35 has substantially the same circumferential width as the corresponding cutout 28 in the drive cylinder 20 and fits in the cutout 28 in the drive cylinder 20. This causes the cover cylinder 30 and the drive cylinder 20 to be integral with each other.

Each cutout 314 in the flange 312 on the front cover 2 has a circumferential width greater than the circumferential width of the corresponding hook 35. To join the cover cylinder 30 and the drive cylinder 20 to the front cover 2, the cover cylinder 30 and the drive cylinder 20 integral with each other are moved in the negative X-direction from the front of the front cover 2 with the hooks 35 in the cover cylinder 30 aligned with the corresponding cutouts 314 in the front cover 2 in the circumferential direction. This allows the engagement tabs 35B in the hooks 35 in the cover cylinder 30 to fit in the corresponding cutouts 314 in the flange 312 on the front cover 2. The cover cylinder 30 and the drive cylinder 20 integral with each other are then rotated (counterclockwise in FIG. 2) relative to the front cover 2. This allows the engagement tabs 35B in the hooks 35 in the cover cylinder 30 to be engaged with the flange 312 on the front cover 2.

Figure 7:
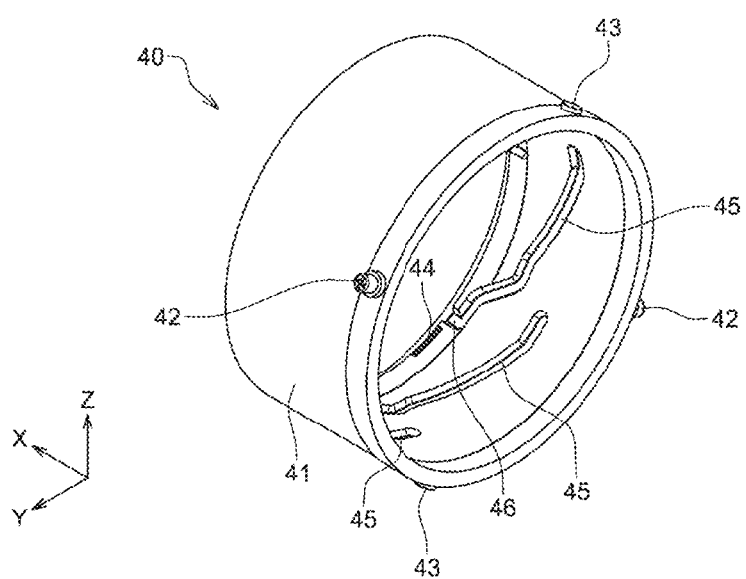
FIG. 7 is a perspective view of a rotary cylinder in the lens barrel in the camera in FIG. 1.

FIG. 7 is a perspective view of the rotary cylinder 40. The rotary cylinder 40 is rotatable relative to the stationary cylinder 10 and movable in the axial direction. As shown in FIGS. 2 and 7, the rotary cylinder 40 includes a cylindrical portion 41 extending in the axial direction (X-direction) and located radially inward from the stationary cylinder 10, two actuation portions 42 protruding radially outward near the rear end of the cylindrical portion 41, two protrusions 43 protruding radially outward near the rear end of the cylindrical portion 41, and three engagement tabs 44 protruding radially inward from the inner circumferential surface of the cylindrical portion 41.

The actuation portions 42 protrude more radially outward than the protrusions 43. For example, the actuation portions 42 may be screws received in bosses located near the rear end of the cylindrical portion 41. In the present embodiment, the actuation portions 42 and the protrusions 43 are alternately located every 90 degrees in the circumferential direction. The three engagement tabs 44 are located at intervals of 120 degrees about the axis.

Each actuation portion 42 has an outer diameter slightly smaller than the axial widths of the rear end 14A and the front end 14B of the corresponding through-cam groove 14 in the stationary cylinder 10, the circumferential width of the intermediate portion 14C of the corresponding through-cam groove 14, and the circumferential width of the corresponding axial groove 24 on the drive cylinder 20. Each actuation portion 42 is thus engaged with the corresponding axial groove 24 on the drive cylinder 20 through the corresponding through-cam groove 14 in the stationary cylinder 10. Each protrusion 43 has an outer diameter smaller than the circumferential width of the corresponding cam groove 15 on the stationary cylinder 10 and is thus movable inside the cam groove 15 on the stationary cylinder 10.

In this structure, the actuation portions 42 of the rotary cylinder 40 are movable inside and along the corresponding through-cam grooves 14 in the stationary cylinder 10 while being engaged with the through-cam grooves 14 in the stationary cylinder 10 and also movable in the axial direction inside the corresponding axial grooves 24 on the drive cylinder 20 while being engaged with the axial grooves 24 on the drive cylinder 20. When the drive cylinder 20 rotates relative to the stationary cylinder 10, the rotary cylinder 40 with its actuation portions 42 engaged with the corresponding axial grooves 24 on the drive cylinder 20 rotates relative to the stationary cylinder 10 together with the drive cylinder 20. The rotary cylinder 40 with its actuation portions 42 engaged with the corresponding through-cam grooves 14 in the stationary cylinder 10 also moves in X-direction relative to the stationary cylinder 10 along the shape of the through-cam grooves 14 (intermediate portions 14C) as the rotary cylinder 40 rotates. In this manner, when the drive cylinder 20 rotates relative to the stationary cylinder 10, the rotary cylinder 40 rotates relative to the stationary cylinder 10 and also extends in the positive X-direction. As the actuation portions 42 of the rotary cylinder 40 move along the corresponding through-cam grooves 14 in the stationary cylinder 10, the protrusions 43 on the rotary cylinder 40 move in the corresponding cam grooves 15 on the stationary cylinder 10. The protrusions 43 on the rotary cylinder 40 and the cam grooves 15 on the stationary cylinder 10 engaged with each other supplementarily support the rotary cylinder 40 inside the stationary cylinder 10.

As shown in FIGS. 3 and 7, the cylindrical portion 41 of the rotary cylinder 40 has, on its inner circumferential surface, six cam grooves 45 and six connecting grooves 46. The cam grooves 45 extend with their circumferential positions gradually changing from their rear ends toward their front ends. The connecting grooves 46 extend in the negative X-direction from the front edge of the rotary cylinder 40 and connect to the front ends of the corresponding cam grooves 45. The six cam grooves 45 and the six connecting grooves 46 are located at intervals of 60 degrees about the axis.

Figure 8:
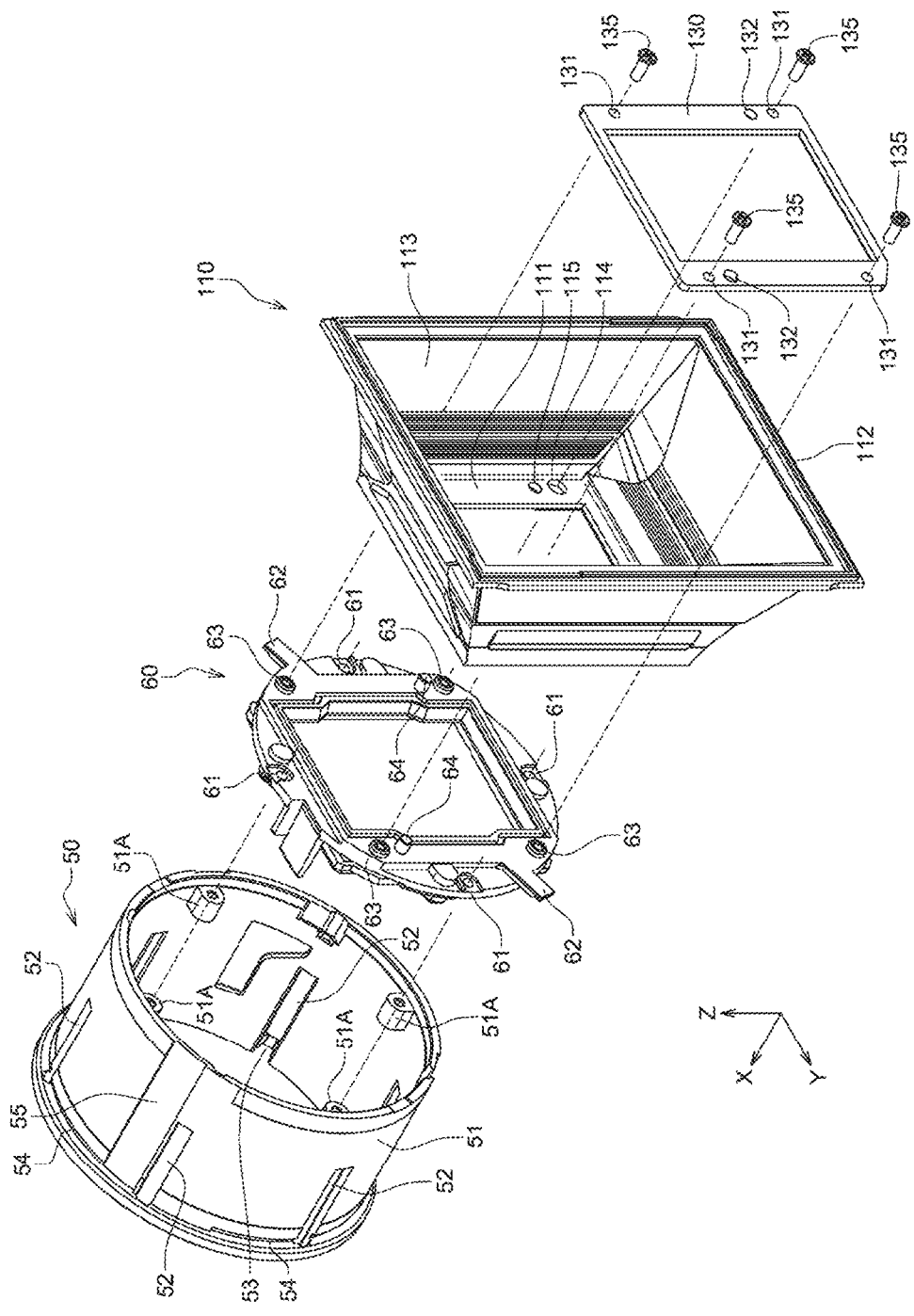
FIG. 8 is an exploded perspective view of a key cylinder in the lens barrel in the camera in FIG. 1, also showing a connecting frame and a rear light shield attached to the rear end of the key cylinder.

FIG. 8 is an exploded perspective view of the key cylinder 50, also showing a connecting frame 60 and a rear light shield 110 attached to the rear end of the key cylinder 50. As shown in FIGS. 3 and 8, the key cylinder 50 includes a cylindrical portion 51 extending in the axial direction (X-direction). The cylindrical portion 51 of the key cylinder 50 is located radially inward from the cylindrical portion 41 of the rotary cylinder 40.

The cylindrical portion 51 of the key cylinder 50 has six axial grooves 52 extending in the axial direction (X-direction) through the cylindrical portion 51 and six connecting grooves 53 extending in the negative X-direction from the front edge of the cylindrical portion 51 and connecting to the ends of the corresponding axial grooves 52. The six axial grooves 52 and the six connecting grooves 53 are all located at intervals of 60 degrees in the circumferential direction.

The cylindrical portion 51 of the key cylinder 50 has, on its outer circumferential surface, three circumferential grooves 54 extending in the circumferential direction near the front edge of the cylindrical portion 51 and three connecting grooves 55 extending in the positive X-direction from the rear edge of the cylindrical portion 51 and connecting to the ends of the corresponding circumferential grooves 54. The three connecting grooves 55 and the three circumferential grooves 54 are all located at intervals of 120 degrees in the circumferential direction.

Each circumferential groove 54 on the key cylinder 50 has an axial width slightly greater than the axial width of the corresponding engagement tab 44 on the rotary cylinder 40. The engagement tabs 44 on the rotary cylinder 40 are thus engaged with the corresponding circumferential grooves 54 on the key cylinder 50 and movable in the circumferential direction inside the corresponding circumferential grooves 54. The key cylinder 50 with its circumferential grooves 54 engaged with the corresponding engagement tabs 44 on the rotary cylinder 40 can thus rotate relative to the rotary cylinder 40 without changing its axial position relative to the rotary cylinder 40.

Each connecting groove 55 on the key cylinder 50 has a circumferential width greater than the circumferential width of the corresponding engagement tab 44 on the rotary cylinder 40. To join the key cylinder 50 to the rotary cylinder 40, the key cylinder 50 is moved in the negative X-direction from the front of the rotary cylinder 40 with the engagement tabs 44 on the rotary cylinder 40 aligned with the corresponding connecting grooves 55 on the key cylinder 50 in the circumferential direction. This allows the engagement tabs 44 on the rotary cylinder 40 to move in the axial direction (X-direction) inside the corresponding connecting grooves 55 on the key cylinder 50 to the ends of the circumferential grooves 54. The key cylinder 50 in this state is then rotated relative to the rotary cylinder 40. This allows the engagement tabs 44 on the rotary cylinder 40 to be engaged with the corresponding circumferential grooves 54 on the key cylinder 50.

As shown in FIG. 8, the cylindrical portion 51 of the key cylinder 50 includes screw receivers 51A along its rear end. The connecting frame 60 is a component for attaching the rear light shield 110 and a front light shield 120 to the rear end of the key cylinder 50. The connecting frame 60 has threaded holes 61. The threaded holes 61 in the connecting frame 60 receive screws (not shown). The screws are screwed into the screw receivers 51A in the key cylinder 50 to fasten the connecting frame 60 to the rear end of the key cylinder 50.

The connecting frame 60 includes two engagement members 62 extending radially outward. Each engagement member 62 has a width slightly smaller than the width of the corresponding axial groove 16 on the stationary cylinder 10. Each engagement member 62 is thus engaged with and movable in the axial direction inside the corresponding axial groove 16 on the stationary cylinder 10. The key cylinder 50 thus does not rotate relative to the stationary cylinder 10, but can move in the axial direction together with the rotary cylinder 40 while rotating relative to the rotary cylinder 40.

Figure 9:
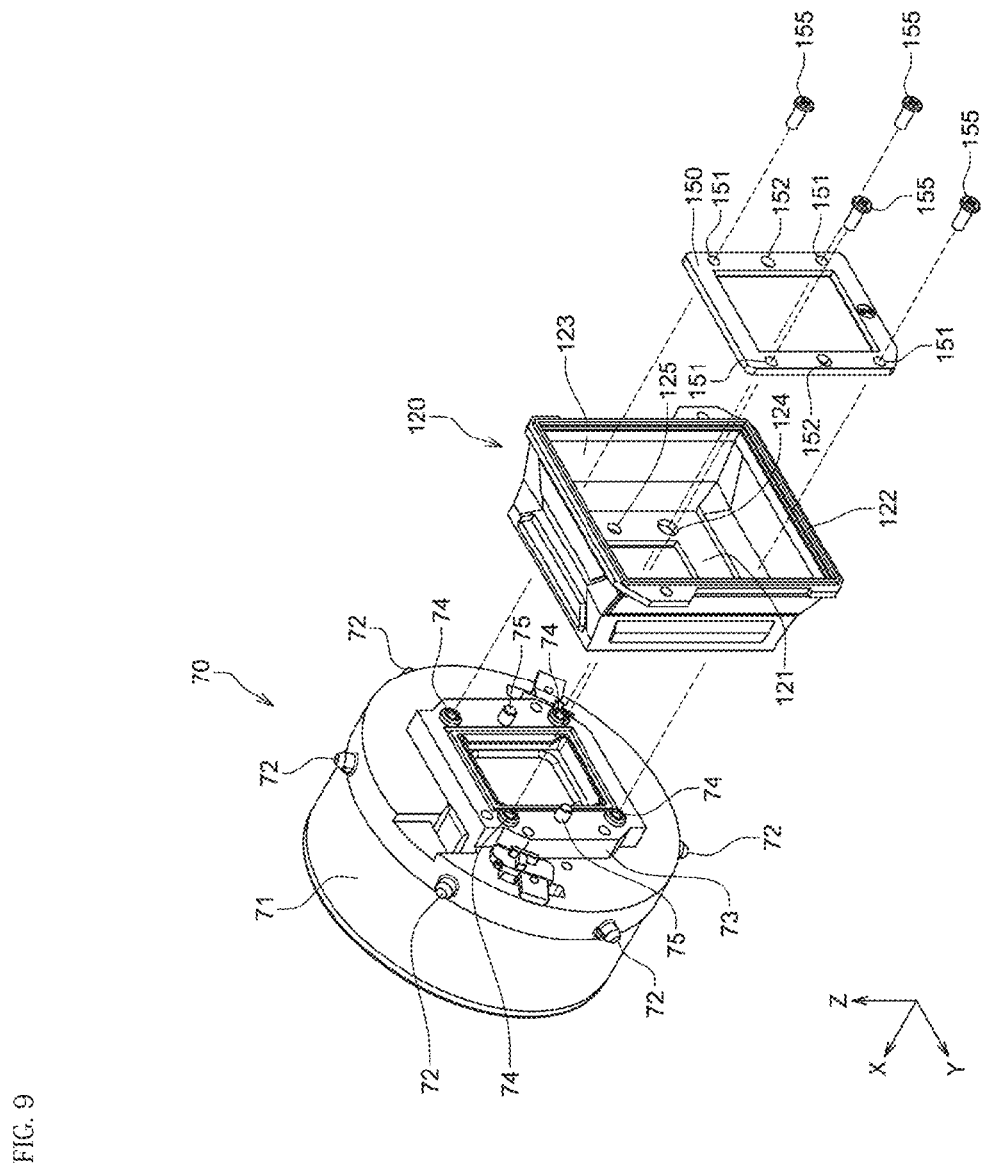
FIG. 9 is an exploded perspective view of a linearly movable cylinder in the lens barrel in the camera in FIG. 1, also showing a front light shield attached to the rear end of the linearly movable cylinder.

FIG. 9 is an exploded perspective view of the linearly movable cylinder 70, also showing the front light shield 120 attached to its rear end. As shown in FIGS. 3 and 9, the linearly movable cylinder 70 includes a cylindrical portion 71 located radially inward from the key cylinder 50 and six cylindrical actuation portions 72 protruding radially outward from its outer circumferential surface. The actuation portions 72 are located at equal intervals in the circumferential direction. Each actuation portion 72 has an outer diameter slightly smaller than the circumferential widths of the corresponding axial groove 52 and the corresponding connecting groove 53 on the key cylinder 50 and the circumferential widths of the corresponding connecting groove 46 and the corresponding cam groove 45 on the rotary cylinder 40. Each actuation portion 72 is thus engaged with the corresponding cam groove 45 on the rotary cylinder 40 through the corresponding axial groove 52 in the key cylinder 50.

The key cylinder 50 does not rotate relative to the stationary cylinder 10 with the engagement between the engagement members 62 in the connecting frame 60 and the axial grooves 16 on the stationary cylinder 10. In contrast, the rotary cylinder 40 is rotatable relative to the stationary cylinder 10. Thus, when the rotary cylinder 40 rotates relative to the stationary cylinder 10, the linearly movable cylinder 70 with its actuation portions 72 engaged with the corresponding cam grooves 45 on the rotary cylinder 40 moves in X-direction relative to the rotary cylinder 40 along the shape of the cam grooves 45. In this manner, the linearly movable cylinder 70 can extend in the positive X-direction from the rotary cylinder 40 as the rotary cylinder 40 rotates relative to the stationary cylinder 10.

To join the linearly movable cylinder 70 to the key cylinder 50, the rotary cylinder 40 is rotated relative to the key cylinder 50 to align the connecting grooves 46 on the rotary cylinder 40 with the corresponding connecting grooves 53 on the key cylinder 50 in the circumferential direction after the key cylinder 50 is joined to the rotary cylinder 40 in the manner described above. The linearly movable cylinder 70 is then moved in the negative X-direction from the fronts of the rotary cylinder 40 and the key cylinder 50 with the actuation portions 72 of the linearly movable cylinder 70 aligned with the corresponding connecting grooves 53 and 46 in the circumferential direction. This allows the actuation portions 72 of the linearly movable cylinder 70 to move from the corresponding connecting grooves 53 into the corresponding axial grooves 52 in the key cylinder 50 as well as from the corresponding connecting grooves 46 into the corresponding cam grooves 45 on the rotary cylinder 40. This allows the actuation portions 72 of the linearly movable cylinder 70 to be engaged with the corresponding axial grooves 52 in the key cylinder 50 and with the corresponding cam grooves 45 on the rotary cylinder 40.

In the present embodiment, as described above, the key cylinder 50 has the connecting grooves 53 on its front edge to guide the actuation portions 72 of the linearly movable cylinder 70 into the corresponding axial grooves 52 in the key cylinder 50, and the rotary cylinder 40 has the connecting grooves 46 on its front edge to guide the actuation portions 72 of the linearly movable cylinder 70 into the corresponding cam grooves 45 on the rotary cylinder 40. For the appearance of the product, the connecting grooves 53 and 46 are not to be exposed outside. The cover ring 58 is thus attached to the key cylinder 50 to cover the front edges of the key cylinder 50 and the rotary cylinder 40. For example, the cover ring 58 can be attached to the key cylinder 50 by fitting a projection 58A (refer to FIG. 3) on the rear surface of the cover ring 58 into one of the connecting grooves 53 on the key cylinder 50.

Figure 10B:
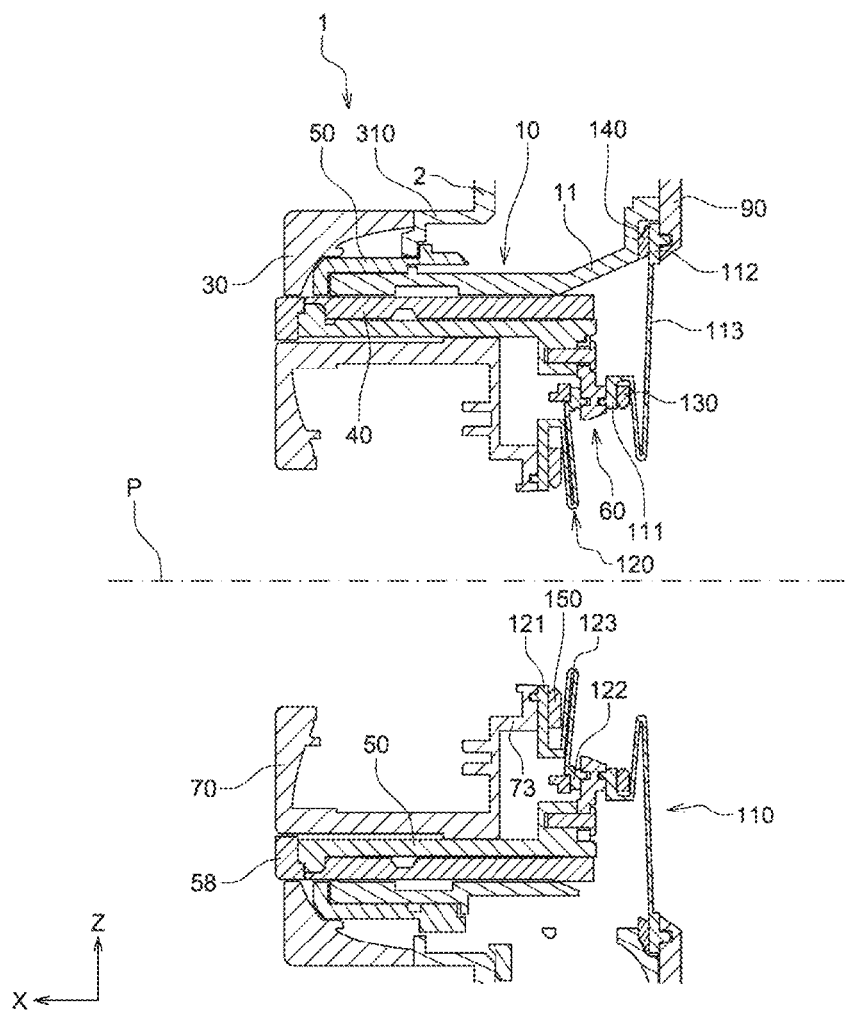
FIG. 10B is a longitudinal sectional view of the camera in FIG. 1 in a retracted state.

FIG. 10A is a longitudinal sectional view of the camera 1 in the most extended state. FIG. 10B is a longitudinal sectional view of the camera 1 in the retracted state. As shown in FIGS. 10A and 10B, the camera 1 according to the present embodiment includes the rear light shield 110 and the front light shield 120 that block light outside the lens barrel 4 entering an optical path in the lens barrel 4. The rear light shield 110 is located between the rear end of the key cylinder 50 and the frame 90. The rear light shield 110 is formed from a flexible material such as rubber and expands and contracts as the key cylinder 50 (rotary cylinder 40) moves in the axial direction relative to the stationary cylinder 10. The front light shield 120 is located between a rear end 73 of the linearly movable cylinder 70 and the rear end of the key cylinder 50. Similarly to the rear light shield 110, the front light shield 120 is formed from a flexible material such as rubber and expands and contracts as the linearly movable cylinder 70 moves in the axial direction relative to the key cylinder 50 (rotary cylinder 40).

Referring back to FIG. 8, the rear light shield 110 includes a front connector 111 being a rectangular frame fastened to the rear end of the key cylinder 50, a rear connector 112 being a rectangular frame secured to the frame 90, and a bellows 113 connecting the front connector 111 and the rear connector 112 in an expandable manner. The rear light shield 110 has a rectangular opening inside. This opening inside the rear light shield 110 gradually enlarges from the front connector 111 toward the rear connector 112.

As shown in FIG. 8, the front connector 111 in the rear light shield 110 has multiple threaded holes 114. The connecting frame 60, which is attached to the key cylinder 50, has threaded holes 63 corresponding to the threaded holes 114 in the front connector 111 in the rear light shield 110. An attachment plate 130 being a rectangular frame is located behind the front connector 111 in the rear light shield 110 (in the negative X-direction). The attachment plate 130 also has threaded holes 131 corresponding to the threaded holes 114 in the front connector 111 in the rear light shield 110. Screws 135 are screwed into the threaded holes 131 in the attachment plate 130, the threaded holes 114 in the front connector 111 in the rear light shield 110, and the threaded holes 63 in the connecting frame 60 attached to the key cylinder 50 to hold the front connector 111 in the rear light shield 110 between the attachment plate 130 and the connecting frame 60 attached to the key cylinder 50.

The rear light shield 110 and the attachment plate 130 are positioned with respect to the connecting frame 60 by placing projections 64 on the connecting frame 60 into positioning holes 115 in the front connector 111 in the rear light shield 110 and positioning holes 132 in the attachment plate 130.

Figure 11:
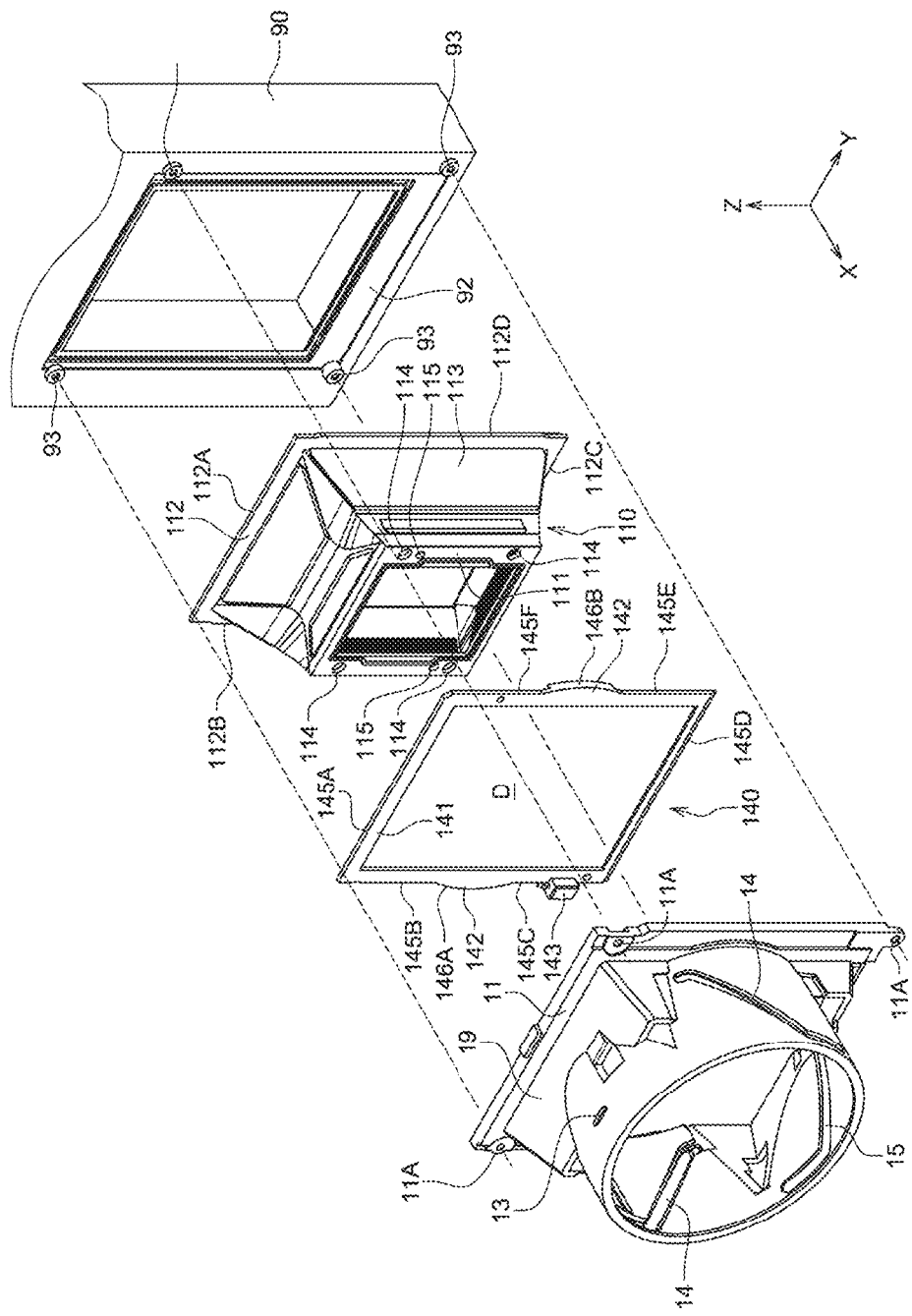
FIG. 11 is an exploded perspective view describing attachment of the rear light shield shown in FIG. 8 to a frame.

FIG. 11 is an exploded perspective view describing attachment of the rear light shield 110 to the frame 90. As shown in FIG. 11, the frame 90 has a rectangular recess 92 for receiving the rear connector 112 in the rear light shield 110. The recess 92 has a rectangular opening inside. A pressure plate 140 is located between the rear connector 112 in the rear light shield 110 and the base 11 in the stationary cylinder 10. The pressure plate 140 presses the rear light shield 110 against the frame 90 to secure the rear light shield 110 to the frame 90.

Figure 12A:
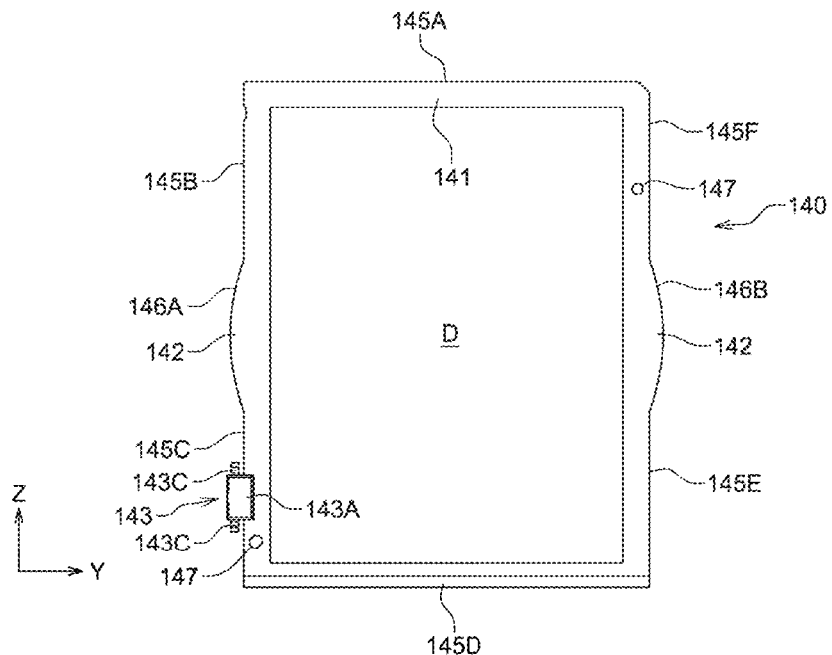
FIG. 12A is a front view of a pressure plate shown in FIG. 11.
Figure 12B:
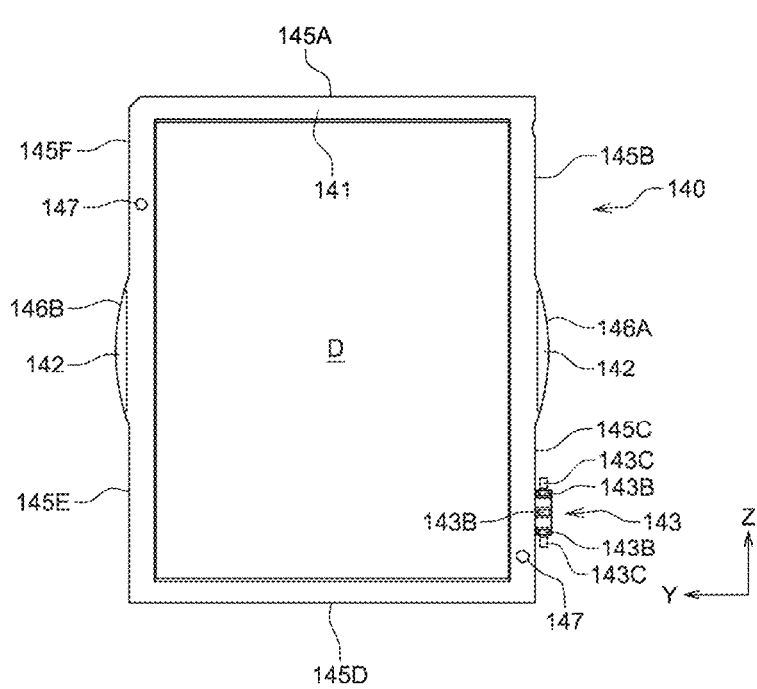
FIG. 12B is a rear view of the pressure plate shown in FIG. 12A.
Figure 12C:
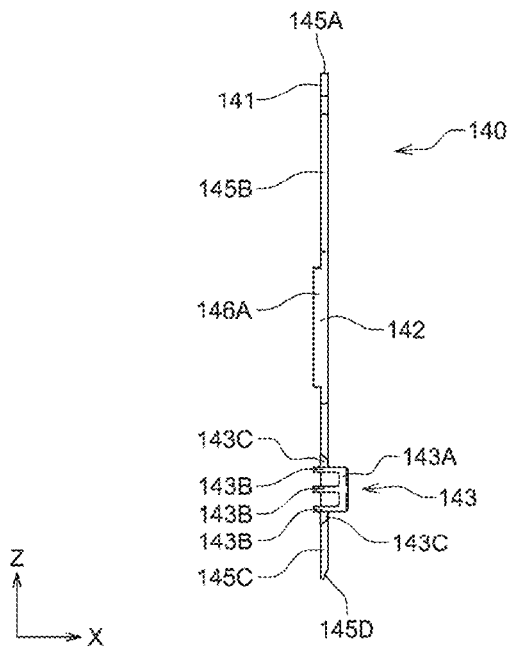
FIG. 12C is a left side view of the pressure plate shown in FIG. 12A.

FIG. 12A is a front view of the pressure plate 140. FIG. 12B is a rear view of the pressure plate 140. FIG. 12C is a left side view of the pressure plate 140. As shown in FIGS. 12A to 12C, the pressure plate 140 includes a pressing portion 141 being a rectangular frame having a rectangular opening D in the center, two extensions 142 extending outward from the pressing portion 141 in Y-direction, and a rectangular support 143. The pressing portion 141 has substantially rectangular outer surfaces 145A to 145F. One extension 142 has an arc-shaped outer surface 146A, and the other extension 142 has an arc-shaped outer surface 146B. The pressing portion 141 is in contact with the front surface of the rear connector 112 in the rear light shield 110. The pressure plate 140 is received in a space in the rear end of the base 11 in the stationary cylinder 10.

Figure 13:
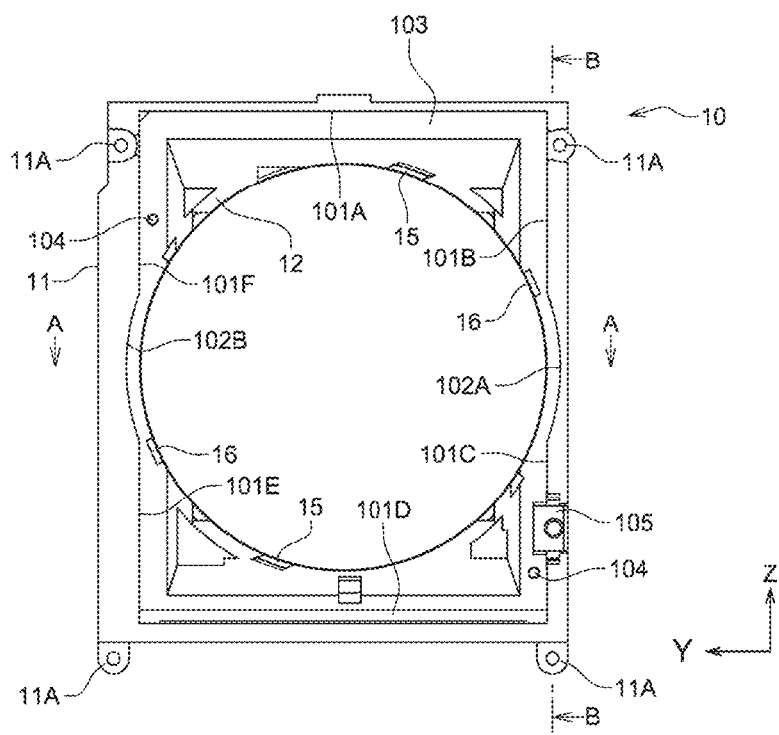
FIG. 13 is a rear view of the stationary cylinder shown in FIG. 5A.

FIG. 13 is a rear view of the stationary cylinder 10. As shown in FIGS. 5B, 11, and 13, the base 11 in the stationary cylinder 10 has, in its rear end, rectangular inner surfaces 10A to 101F facing outer surfaces 112A to 112D of the rear connector 112 in the rear light shield 110, an arc surface 102A extending outward (in the negative Y-direction) in an arc from the inner surfaces 101B and 101C along a part of the cylindrical wall 12, an arc surface 102B extending outward (in the positive Y-direction) in an arc from the inner surfaces 101E and 101F along a part of the cylindrical wall 12, and a contact surface 103 in contact with the front surface of the pressure plate 140. The pressure plate 140 is received in a recess defined by the inner surfaces 101A to 101F, the arc surfaces 102A and 102B, and the contact surface 103 of the base 11.

More specifically, the pressure plate 140 is received in the recess described above to have the outer surface 145A facing the inner surface 101A of the base 11 in the stationary cylinder 10, the outer surface 145B facing the inner surface 101B of the base 11, the outer surface 146A facing the arc surface 102A of the base 11, the outer surface 145C facing the inner surface 101C of the base 11, the outer surface 145D facing the inner surface 101D of the base 11, the outer surface 145E facing the inner surface 101E of the base 11, the outer surface 146B facing the arc surface 102B of the base 11, and the outer surface 145F facing the inner surface 101F of the base 11. The pressure plate 140 is positioned with respect to the base 11 in the stationary cylinder 10 by placing projections 104 on the base 11 into positioning holes 147 in the pressing portion 141 of the pressure plate 140.

The rear connector 112 in the rear light shield 110 is received in the recess described above to be in contact with the rear surface of the pressing portion 141 of the pressure plate 140. The rear connector 112 in the rear light shield 110 in this state has the outer surface 112A (refer to FIG. 11; the same applies hereafter) facing the inner surface 101A of the base 11 in the stationary cylinder 10, the outer surface 112B facing the inner surfaces 101B and 101C of the base 11, the outer surface 112C facing the inner surface 101D of the base 11, and the outer surface 112D facing the inner surfaces 101E and 101F of the base 11.

As described above, the stationary cylinder 10 is fastened to the frame 90 with the screws 91 (refer to FIG. 2) received in the threaded holes 11A in the base 11 in the stationary cylinder 10 and screwed into threaded holes 93 in the frame 90. With the stationary cylinder 10 fastened to the frame 90 in this manner, the contact surface 103 of the base 11 in the stationary cylinder 10 presses the pressure plate 140 received in the recess described above in the negative X-direction. This causes the rear connector 112 in the rear light shield 110 to be held between the pressing portion 141 of the pressure plate 140 and the frame 90.

Figure 14:
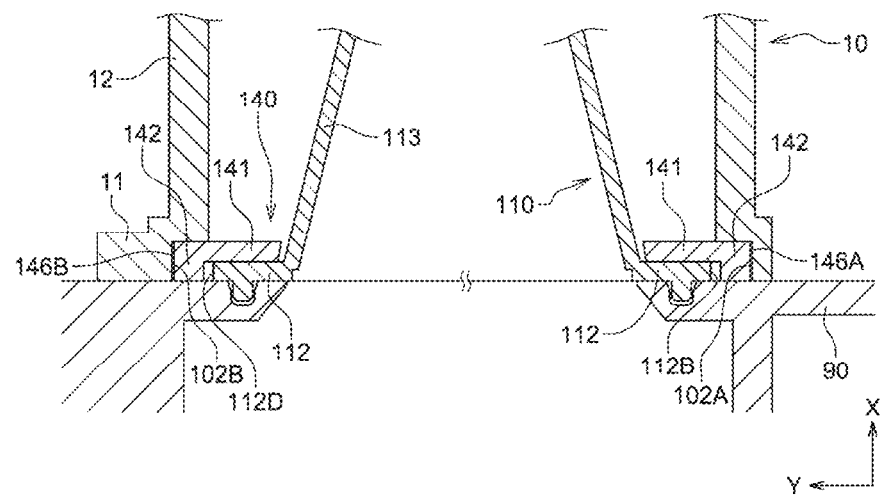
FIG. 14 is an enlarged schematic sectional view of the camera in FIG. 1 taken along line A-A in FIG. 13.

FIG. 14 is an enlarged schematic sectional view of the camera 1 taken along line A-A in FIG. 13. For ease of understanding, components other than the stationary cylinder 10, the pressure plate 140, the rear light shield 110, and the frame 90 are not shown in FIG. 14. As shown in FIG. 14, the extensions 142 in the pressure plate 140 extend outward from the pressing portion 141 to have their outer surfaces 146A and 146B facing the respective arc surfaces 102A and 102B of the base 11 in the stationary cylinder 10. This structure is less likely to create gaps between the arc surfaces 102A and 102B along the cylindrical wall 12 of the stationary cylinder 10 and the pressure plate 140. This reduces the likelihood that the rear connector 112 in the rear light shield 110 separates or slips off, thus maintaining the light-shielding and dustproof performance of the rear light shield 110.

In the present embodiment, as shown in FIG. 14, each extension 142 in the pressure plate 140 has a thickness in X-direction greater than the thickness of the pressing portion 141 in X-direction, and the extensions 142 are partly located outward from the outer surfaces 112B and 112D of the rear connector 112 in the rear light shield 110. The rear connector 112 in the rear light shield 110 is thus also surrounded by the extensions 142 in the pressure plate 140 in its portions facing the arc surfaces 102A and 102B of the base 11 in the stationary cylinder 10. This more reliably reduces the likelihood that the rear connector 112 in the rear light shield 110 separates or slips off.

Figure 15:
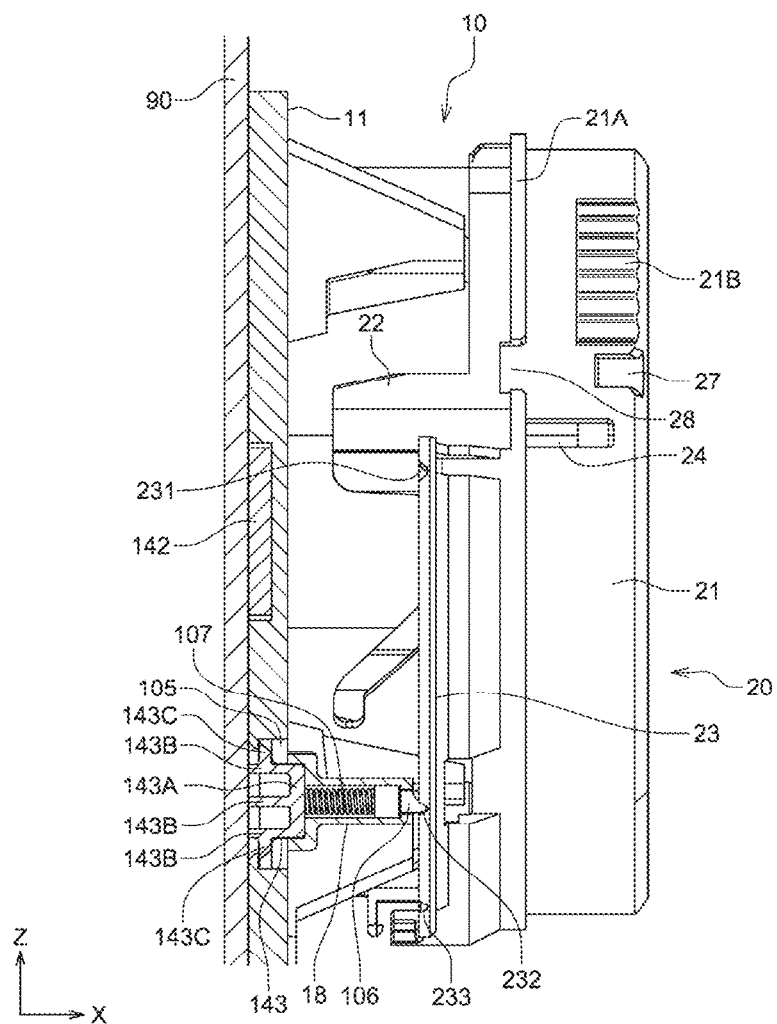
FIG. 15 is a schematic partial sectional view of the camera in FIG. 1 taken along line B-B in FIG. 13.

FIG. 15 is a schematic partial sectional view of the camera 1 taken along line B-B in FIG. 13. For ease of understanding, components other than the stationary cylinder 10, the pressure plate 140, the drive cylinder 20, and the frame 90 are not shown in FIG. 15. As shown in FIG. 15, the base 11 in the stationary cylinder 10 includes a compartment 105 behind and adjacent to the pin holder 18. The compartment 105 accommodates the support 143 in the pressure plate 140. The pin holder 18 accommodates the pin 106 with a pointed tip and a coil spring 107 as an urging member to urge the pin 106 in the positive X-direction. The pin 106 is held in the pin holder 18 in a manner movable in X-direction.

The support 143 in the pressure plate 140 accommodated in the compartment 105 in the base 11 is located behind the coil spring 107 accommodated in the pin holder 18 to support the coil spring 107. In this structure, the pin 106 in the pin holder 18 is pressed against the rear surface of the arc-shaped piece 23 in the drive cylinder 20 while being urged in the positive X-direction. As described above, the arc-shaped piece 23 in the drive cylinder 20 has, on its rear surface, the recesses 231, 232, and 233 at the three circumferential positions that correspond to the different extended states of the lens barrel 4. When the recess 231 on the rotating drive cylinder 20 moves to the position of the pin 106, the pin 106 fits into the recess 231. When the recess 232 on the rotating drive cylinder 20 moves to the position of the pin 106, the pin 106 fits into the recess 232. When the recess 233 on the rotating drive cylinder 20 moves to the position of the pin 106, the pin 106 fits into the recess 233. This allows the user rotating the cylindrical portion 31 of the cover cylinder 30, which is integral with the drive cylinder 20, to receive tactile feedback at each position and learn that the lens barrel 4 is in a predetermined extended state. In the present embodiment, the pin 106 fits in the recess 231 when the lens barrel 4 is in the retracted state, in the recess 232 (the state shown in FIG. 15) when the lens barrel 4 is in the state for performing a normal photographing operation, and in the recess 233 when the lens barrel 4 is in the state for performing a short-distance macro photographing operation (the most extended state).

As shown in FIGS. 12A, 12B, and 12C, the support 143 in the pressure plate 140 includes a contact portion 143A in contact with the coil spring 107, three legs 143B extending rearward from the contact portion 143A, and tabs 143C extending outward from the corresponding legs 143B and engaged with the edges of the compartment 105 in the base 11. The support 143 in the pressure plate 140 including the multiple narrow legs 143B extending rearward from the contact portion 143A can deform easily and is thus easily accommodated in the compartment 105 in the base 11 in the stationary cylinder 10. In addition, the support 143 in the pressure plate 140 includes the tabs 143C engaged with the edges of the compartment 105 in the base 11. This structure prevents the support 143 in the pressure plate 140 from slipping off the compartment 105 in the base 11.

As described above, the pressure plate 140 including the support 143 can, in addition to securing the rear connector 112 in the rear light shield 110 to the frame 90, support the coil spring 107 urging the pin 106 described above. This structure eliminates any additional component to support the coil spring 107 urging the pin 106, and thus reduces the number of components and the manufacturing cost.

Referring back to FIG. 9, the front light shield 120 includes a front connector 121 being a rectangular frame fastened to the rear end 73 of the linearly movable cylinder 70, a rear connector 122 being a rectangular frame fastened to the connecting frame 60 attached to the key cylinder 50, and a bellows 123 connecting the front connector 121 and the rear connector 122 in an expandable manner. The front light shield 120 has a rectangular opening inside. This opening inside the front light shield 120 gradually enlarges from the front connector 121 toward the rear connector 122.

As shown in FIG. 9, the front connector 121 in the front light shield 120 has multiple threaded holes 124. The rear end 73 of the linearly movable cylinder 70 has threaded holes 74 corresponding to the threaded holes 124 in the front connector 121 in the front light shield 120. An attachment plate 150 being a rectangular frame is located behind the front connector 121 in the front light shield 120 (in the negative X-direction). The attachment plate 150 also has threaded holes 151 corresponding to the threaded holes 124 in the front connector 121 in the front light shield 120. Screws 155 are screwed into the threaded holes 151 in the attachment plate 150, the threaded holes 124 in the front connector 121 in the front light shield 120, and the threaded holes 74 in the rear end 73 of the linearly movable cylinder 70 to hold the front connector 121 in the front light shield 120 between the attachment plate 150 and the rear end 73 of the linearly movable cylinder 70.

The front light shield 120 and the attachment plate 150 are positioned with respect to the linearly movable cylinder 70 by placing projections 75 on the rear end 73 of the linearly movable cylinder 70 into positioning holes 125 in the front connector 121 in the front light shield 120 and positioning holes 152 in the attachment plate 150.

Figure 16:
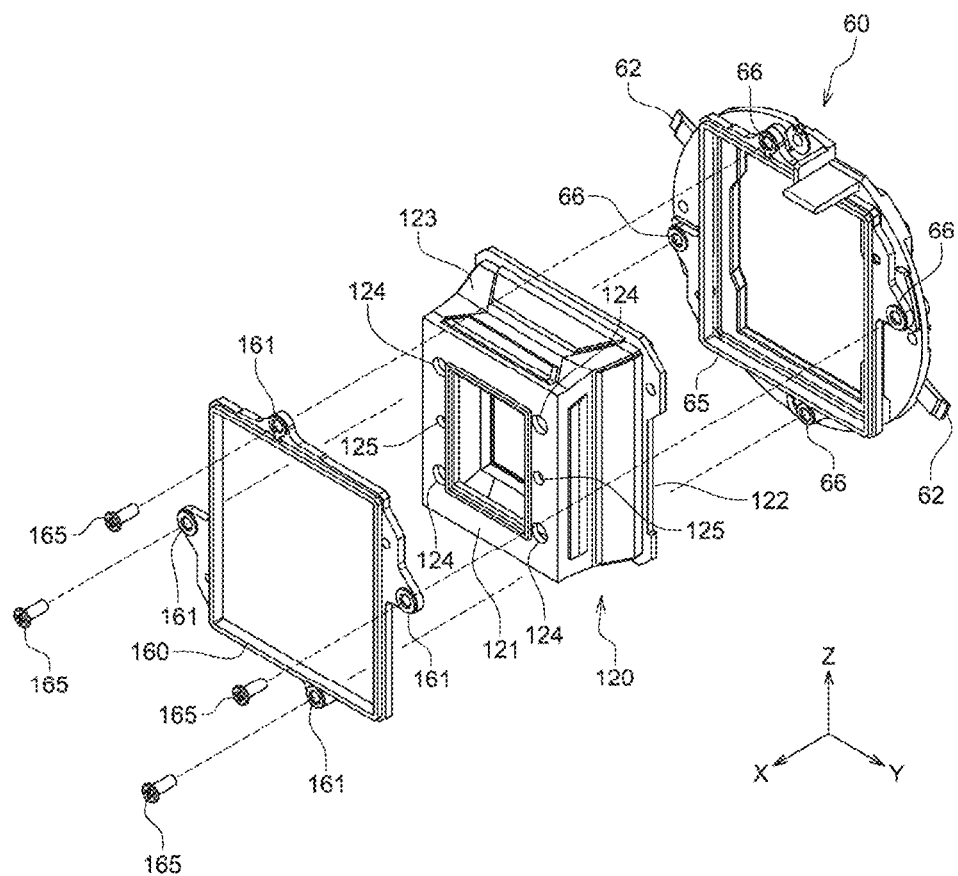
FIG. 16 is an exploded perspective view describing attachment of the front light shield shown in FIG. 9 to the connecting frame.

FIG. 16 is an exploded perspective view describing attachment of the front light shield 120 to the connecting frame 60. As shown in FIG. 16, the connecting frame 60 includes a frame 65 for receiving the rear connector 122 in the front light shield 120. An attachment plate 160 being a rectangular frame is located in front of the rear connector 122 in the front light shield 120 (in the positive X-direction). The attachment plate 160 has multiple threaded holes 161. The connecting frame 60 has threaded holes 66 corresponding to the threaded holes 161 in the attachment plate 160. Screws 165 are screwed into the threaded holes 161 in the attachment plate 160 and the threaded holes 66 in the connecting frame 60 to hold the rear connector 122 in the front light shield 120 between the attachment plate 160 and the connecting frame 60.

In the above embodiment, when the user rotates the cylindrical portion 31 of the cover cylinder 30 relative to the stationary cylinder 10 in the retracted state of the camera 1 shown in FIG. 1, the drive cylinder 20 rotates integrally with the cover cylinder 30. This causes the rotary cylinder 40 with its actuation portions 42 engaged with the corresponding axial grooves 24 on the drive cylinder 20 as well as with the corresponding through-cam grooves 14 in the stationary cylinder 10 to rotate integrally with the drive cylinder 20 and also to move in the axial direction along the shape of the through-cam grooves 14 in the stationary cylinder 10. This causes the linearly movable cylinder 70 with its actuation portions 72 engaged with the corresponding axial grooves 52 in the key cylinder 50 as well as with the corresponding cam grooves 45 on the rotary cylinder 40 to move in the axial direction along the shape of the cam grooves 45 on the rotary cylinder 40 without rotating relative to the stationary cylinder 10. In this manner, both the rotary cylinder 40 and the linearly movable cylinder 70 in the lens barrel 4 can be extended in the axial direction. In the retracted state and the most extended state, each extending portion 22 of the drive cylinder 20 is in contact with an edge 19A of the corresponding mount 19 on the base 11 in the stationary cylinder 10 (refer to FIGS. 3 and 5A), thus restricting further rotation of the drive cylinder 20.

The connecting frame 60 is attached to the rear end of the key cylinder 50 that extends in the axial direction together with the rotary cylinder 40, and the expandable bellows 113 in the rear light shield 110 connects the connecting frame 60 and the frame 90. This structure blocks light outside the lens barrel 4 entering the optical path between the rear end of the key cylinder 50 and the frame 90. The expandable bellows 123 in the front light shield 120 connects the rear end 73 of the linearly movable cylinder 70 and the connecting frame 60. This structure blocks light outside the lens barrel 4 entering the optical path between the rear end 73 of the linearly movable cylinder 70 and the rear end of the key cylinder 50.

As described above, a camera according to one aspect of the present invention is less likely to have lower light-shielding performance. The camera includes a housing having a front surface with an opening, a frame accommodated in the housing, and a lens barrel accommodating at least one lens. The lens barrel includes a stationary cylinder including a base fastened to the frame and a cylindrical wall extending in an axial direction from the base, and an extendable unit located radially inward from the cylindrical wall of the stationary cylinder. The extendable unit is extendable in the axial direction through the opening in the housing. The camera further includes a light shield that blocks light outside the lens barrel entering an optical path between a part of the extendable unit and the frame and a pressure plate pressing the light shield against the frame and securing the light shield to the frame. The light shield includes a front connector being a rectangular frame fastened to the part of the extendable unit in the lens barrel, a rear connector being a rectangular frame located between the pressure plate and the frame, and a bellows connecting the front connector and the rear connector in an expandable manner. The base in the stationary cylinder has an inner surface being rectangular and facing an outer surface of the rear connector in the light shield, an arc surface extending outward in an arc from the inner surface along a part of the cylindrical wall, and a contact surface in contact with a front surface of the pressure plate. The pressure plate includes a pressing portion being a rectangular frame extending along the inner surface of the base in the stationary cylinder and in contact with the rear connector in the light shield, and an extension extending outward from the pressing portion and facing the arc surface of the base in the stationary cylinder.

In this structure, with the base in the stationary cylinder fastened to the frame, the contact surface of the base in the stationary cylinder presses the pressure plate against the frame. This allows the rear connector in the light shield to be held between the pressing portion of the pressure plate and the frame. In this state, the extension in the pressure plate extending outward from the pressing portion face the arc surface of the base in the stationary cylinder. This structure is less likely to create gaps between the arc surface along the cylindrical wall of the stationary cylinder and the pressure plate. This reduces the likelihood that the rear connector in the light shield separates or slips off, thus maintaining the light-shielding and dustproof performance of the light shield.

The extension may be thicker than the pressing portion and partly located outward from the rear connector in the light shield. In this case, the rear connector in the light shield is also surrounded by the extension in the pressure plate in its portions facing the arc surface of the base in the stationary cylinder. This more reliably reduces the likelihood that the rear connector in the light shield separates or slips off.

The lens barrel may further include a drive cylinder that drives the extendable unit to extend and retract. The drive cylinder is rotatable relative to the stationary cylinder without moving in the axial direction. The drive cylinder may include a cylindrical portion located radially outward from the cylindrical wall of the stationary cylinder and an arc-shaped piece extending radially outward from the cylindrical portion. The arc-shaped piece has a recess at a circumferential position corresponding to an extended state of the lens barrel. The stationary cylinder may further include a pin, a pin holder holding the pin movable in the axial direction, an urging member urging, in the pin holder, the pin toward the arc-shaped piece in the drive cylinder, and a compartment adjacent to the pin holder. The pressure plate may further include a support accommodated in the compartment in the stationary cylinder and supporting the urging member in the stationary cylinder. The pressure plate including the support can not only secure the rear connector in the light shield to the frame but also support the urging member urging the pin in the stationary cylinder. This structure eliminates any additional component for supporting the urging member urging the pin, and thus reduces the number of components and the manufacturing cost.

The support in the pressure plate may include a contact portion in contact with the urging member in the stationary cylinder and a plurality of legs extending rearward from the contact portion. The support including the multiple legs extending rearward from the contact portion can deform easily and is thus easily accommodated in the compartment in the stationary cylinder.

The support in the pressure plate may include a tab engaged with an edge of the compartment in the stationary cylinder. This structure with the support in the pressure plate including the tab that is engaged with the edge of the compartment in the base prevents the support in the pressure plate from slipping off the compartment in the base.

The stationary cylinder may further include a projection extending in the axial direction from the contact surface. The pressing portion of the pressure plate may have a positioning hole receiving the projection on the stationary cylinder. This structure facilitates the positioning of the pressure plate with respect to the base in the stationary cylinder.

Although the embodiments of the present invention have been described above, the present invention is not limited to the above embodiments and may be modified variously within the scope of its technical idea.

What is claimed is:

1. A camera, comprising:
   a housing having a front surface with an opening;
   a frame accommodated in the housing;
   a lens barrel accommodating at least one lens, the lens barrel including
      a stationary cylinder including a base fastened to the frame and a cylindrical wall extending in an axial direction from the base, and
      an extendable unit located radially inward from the cylindrical wall of the stationary cylinder, the extendable unit being extendable in the axial direction through the opening in the housing;
   a light shield configured to block light outside the lens barrel entering an optical path between a part of the extendable unit and the frame; and
   a pressure plate pressing the light shield against the frame and securing the light shield to the frame,
   wherein the light shield includes
      a front connector being a rectangular frame fastened to the part of the extendable unit in the lens barrel,
      a rear connector being a rectangular frame located between the pressure plate and the frame, and
      a bellows connecting the front connector and the rear connector in an expandable manner,
   the base in the stationary cylinder has
      an inner surface being rectangular and facing an outer surface of the rear connector in the light shield,
      an arc surface extending outward in an arc from the inner surface along a part of the cylindrical wall, and
      a contact surface in contact with a front surface of the pressure plate, and
   the pressure plate includes
      a pressing portion being a rectangular frame extending along the inner surface of the base in the stationary cylinder and in contact with the rear connector in the light shield, and
      an extension extending outward from the pressing portion and facing the arc surface of the base in the stationary cylinder.

2. The camera according to claim 1, wherein
the extension is thicker than the pressing portion, and the extension is partly located outward from the rear connector in the light shield.

3. The camera according to claim 1, wherein
the lens barrel further includes a drive cylinder configured to drive the extendable unit to extend and retract, the drive cylinder is rotatable relative to the stationary cylinder without moving in the axial direction,
the drive cylinder includes
   a cylindrical portion located radially outward from the cylindrical wall of the stationary cylinder, and
   an arc-shaped piece extending radially outward from the cylindrical portion, the arc-shaped piece has a recess at a circumferential position corresponding to an extended state of the lens barrel,
the stationary cylinder further includes
   a pin,
   a pin holder holding the pin movable in the axial direction,
   an urging member urging, in the pin holder, the pin toward the arc-shaped piece in the drive cylinder, and
   a compartment adjacent to the pin holder, and
the pressure plate further includes a support accommodated in the compartment in the stationary cylinder and supporting the urging member in the stationary cylinder.

4. The camera according to claim 3, wherein
the support in the pressure plate includes
   a contact portion in contact with the urging member in the stationary cylinder, and a plurality of legs extending rearward from the contact portion.

5. The camera according to claim 3, wherein
the support in the pressure plate includes a tab engaged with an edge of the compartment in the stationary cylinder.

6. The camera according to claim 1, wherein
the stationary cylinder further includes a projection extending in the axial direction from the contact surface, and
the pressing portion of the pressure plate has a positioning hole receiving the projection on the stationary cylinder.

* * * * *